Nov. 11, 1969  W. TILSE ET AL  3,477,223
FREQUENCY STANDARD
Filed March 8, 1967  2 Sheets-Sheet 1
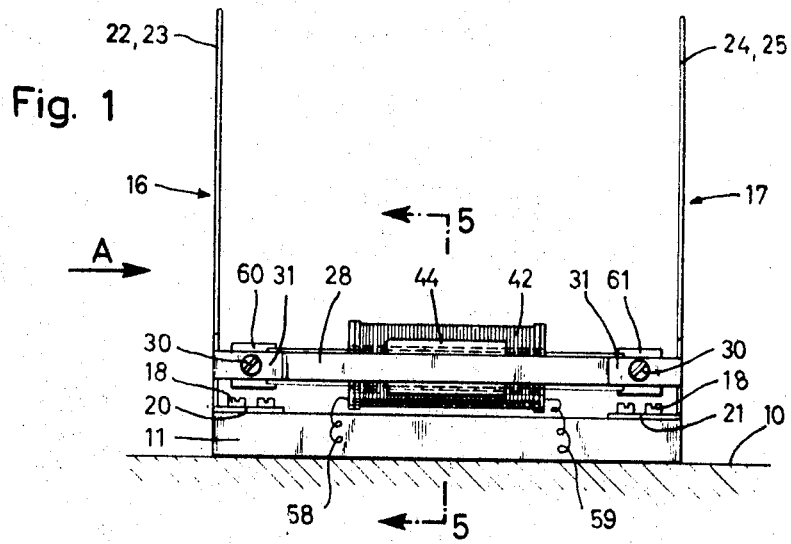
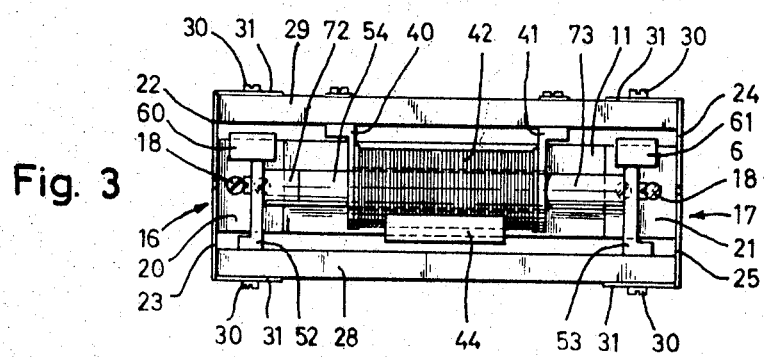
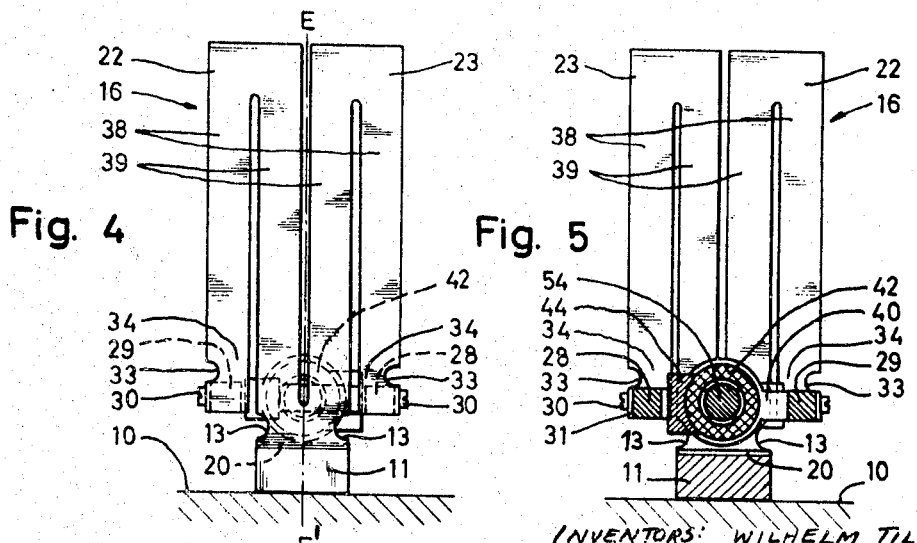
INVENTORS: WILHELM TILSE
ROLF WEISE 3,477,223
FREQUENCY STANDARD
Wilhelm Tilse and Rolf Weise, Pforzheim, Germany, assignors to The United States Time Corporation, Waterbury, Conn., a corporation of Connecticut
Filed Mar. 8, 1967, Ser. No. 621,482
Claims priority, application Germany, Mar. 24, 1966
U 12,540
Int. Cl. G04c 3/00
U.S. Cl. 58—23                                5 Claims

ABSTRACT OF THE DISCLOSURE

An electromechanical frequency standard for use in horology consists of two flat flexible spring plates. Each plate has two extending arms or reeds. Opposite reeds of each plate are fastened to connection pieces, one of which preferably carries a magnet and the other a coil. The plates are attached to a base and to their connection pieces by integral extensions which are bent at an angle, preferably of 90°, to the plates. The bends are made accurately and determine the active length, and therefore the desired frequency, of the oscillator.

---

The present invention relates to horology and more particularly to a frequency standard including an electromechanical oscillator.

The accuracy of a horological instrument is dependent upon the accuracy of its frequency standard. Many types of frequency standards have been proposed and used, such as balance wheels, tuning forks and quartz crystals. These have disadvantages because of problems of cost, power consumption and lack of accuracy due to position sensitivity and sensitivity to shocks.

An improved electromechanical frequency standard is described in U.S. Patent 3,201,932 and shown in FIGS. 22-26. It is accurate and yet reasonable in cost. That frequency standard consists of a mechanical oscillator which has two partial oscillators. Each of the partial oscillators consists of a flat spring plate provided with two arms or reeds. The reeds are arranged symmetrically about one plate. The elasticity constant of the reeds in the oscillation direction (parallel to the symmetry plane) is lower than in the other directions. The feet of the partial oscillators are fixed to a base at nodal points which lie in the symmetry plane. Connection pieces are attached to the free ends of the reeds. Each central point of the partial oscillators perform a nearly straight oscillation. The oscillations are oppositely directed and compensated so that vibrations are not transmitted to the base.

However, in this oscillating system the fixation of the oscillators on the connection pieces presents problems. The free ends of the partial oscillators, i.e., the ends of the reeds, are directly attached to the connection pieces. The quality and the accuracy of this attahcment affects the active spring length of the oscillator. Even when the blank of the single oscillator is cut with high precision, the active spring length is not precisely determined because of variations in its attachment points.

It is the objective of the present invention to provide a mechanical oscillator in a frequency standard in which the dimensions of the active oscillator parts are not affected by the joining of the oscillator with the other parts of the mechanism.

In accordance with the present invention, a frequency standard is constructed having two partial oscillators. The two oscillators are each made in the form of a flat sheet of spring material, preferably by die cutting. The blank of each oscillator has two free ends. Extension pieces, integral with the free ends, are provided to attach the free ends to their connection pieces. Each of the extensions is precision bent, preferably at a 90° angle. The bending determines the exact active length, and consequently the frequency of the oscillator.

If the outer edge of an outer arm were to form a right, or acute, angle with the neighboring edge of the extension part piece (at the flat blank form of the oscillator) then the bending line may create a structural weakness at the edge. One solution would be to shift the bending line to the extension piece itself; however, the oscillator would then have a relatively large width. The preferred solution of the present invention is to provide a recess on the outer edge of each outer arm. The edge of the recess blends into that of the extension part piece. These recesses prevent fractures from metal fatigue.

An extension part is also provided on the oscillator foot, i.e., the portion joining the arms. This extension is also bent, preferably rectangularly at a 90° angle, to the longitudinal direction of the arms. Recesses are provided at the bending line. The recesses are on the edges of the oscillator foot and blend into the bending line. This extension avoids the transmission of torsional oscillations of the oscillator foot to the base.

The bending operations make the oscillation behavior of the oscillator dependent only on the accuracy of the production of the blank.

Other objectives of the present invention will be apparent from the below-described embodiment of the present invention, the description being in reference to the accompanying drawings. In the drawings:

FIG. 1 is a side plan view of the oscillation system according to the present invention;

FIG. 3 is a top plan view of the oscillation system according to FIG. 1;

FIG. 4 is a front plan view of the oscillation system in direction of the arrow A in FIG. 1; and FIG. 5 is a sectional view taken along the line 5—5 in FIG. 1.

Figure 2:
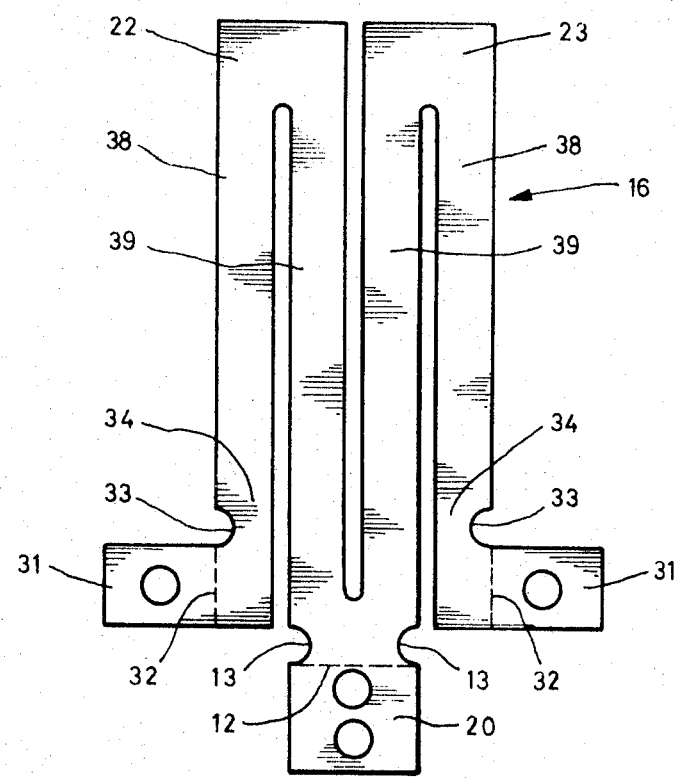
FIG. 2 is a top plan view of a blank of a single oscillator according to the present invention.

The oscillation system has a base 11 fixed on the frame plate of a horological instrument, such as a watch. Two oscillators 16 and 17 are attached to opposite ends of base 11 by means of screws 18.

The identical oscillators 16 and 17 are shown in their flat blank form in FIG. 2. Each of the oscillators 16 and 17 have a foot piece 20 and 21, respectively. Two U-shaped partial oscillator arms 22, 23 and 24, 25, respectively, which are flat reeds, are integral with the foot pieces 20 and 21, respectively. The foot pieces 20 and 21 are integral with a portion joining the arms 22, 23 and 24, 25. The foot pieces 20, 21 are bent around a bending line 12 which blends with the recesses 13.

The extension part pieces 31 are integral with the free end pieces 34 of the outer arms 38. The extension pieces 31 are preferably bent at a 90° angle around the bending lines 32. The upper edge of bending lines 32 blend with the edge of a recess 33 which is provided on the outer edge of each outer arm 38.

The center of gravity of the partial oscillation system oscillates in a straight line when the outer arm 38 of the concerned partial oscillator is about equally long as the inner arm 39. However, it is required that the partial oscillators have a constant cross-section and are equal among themselves as in this form of construction.

The partial oscillator arms 23 and 25, as well as the partial oscillator arms 22 and 24, are rigidly connected with each other by connection pieces 28 and 29 to form two partial oscillation systems, see FIGS. 1 and 3. These connection pieces 28 and 29 are rigidly fixed on the extension part pieces 31 of the partial oscillator arms by means of screws.

An exciter coil 42 is fixed on the connection piece 29 by means of the L-shaped coil holders 40 and 41, which are screwed on the connection piece 29. A compensation weight 44 is glued on the side of the coil 42 opposite to the connection piece 29. The mass of weight 44 is determined in such a manner that the center of gravity of the partial oscillation system (consisting of the parts 22, 24, 29, 40, 41, 42 and 44) passes in the middle plane traced by the symmetry lines E–E¹ of both oscillators 16 and 17. The connection piece 29 is fixed on the outer arms 38 of both partial oscillators in such a position that the center of gravity of this partial oscillation system oscillates in a straight line. A permanent magnet 54 is fixed on the connection piece 28 by means of the L-shaped carrier 52 and 53 between tubular cylindrical plastic parts 72 and 73. The permanent magnet enters partially into the coil 42 and cooperates with it in such a manner that the connection pieces 28 and 29 are excited to oppositely directed oscillations of equal energy content when pulsed by an electric current. The coil 42 is self-controllingly excited in such a manner that an oscillation of a predetermined amplitude will be maintained. A suitable circuit for the purpose is shown in U.S. Patent 3,084,316 to Zemla.

Compensation weights 60 and 61 are fixed on the carriers 52 and 55. The center of gravity of the partial oscillation system (consisting of the parts 23, 25, 28, 52, 53, 54, 72 and 73) is placed also in the middle plane of the shown oscillation system. The connection piece 28 is fixed on the partial oscillators 23 and 25 in such a manner that the center of gravity of the partial oscillation system performs a straight-lined motion.

The blank of both oscillators 16 respectively 17, shown in FIG. 2, is preferably blanked out of sheet metal so that the accuracy to size of the active oscillator parts is determined only by the blanking tool. The length of the outer arms 38 is not changed by the bending of the extension part pieces 31 around the bending lines 32. Consequently, the accuracy to size of the bending tool has no effect on the active oscillator.

Torsional oscillations, in the range of the inner arms 39, will be prevented from being transmitted to the base 11 by the bending of the foot piece 20 around the bending line 12. This bending increases the stiffness of the range of the foot pieces. This contributes extraordinarily to the rate accuracy of the oscillation system since it provides a minimum damping.

The oscillator is divided in active and inactive part pieces by means of the angular extension part pieces which are directed in a plane opposite to the general oscillator plane. The joining of the oscillator occurs only on the inactive part pieces. The quality and accuracy of the joints between the oscillator and the connection pieces and the oscillator and the base has no effect on those dimensions of the oscillator which determine its oscillations.

An especially good separation into active and inactive parts of the oscillator occurs when the extension pieces of the outer free arms are bent around a line parallel to the longitudinal direction of the arms, i.e., at a 90° angle. The stiffness is the greatest between the extension part piece and the outer arm with that angle.

Modifications may be made in the above-described embodiment within the scope of the present invention.

It is claimed:

1. A horological instrument having a frame and including a frequency standard, the frequency standard including a mechanical vibrator having a base mounted on the frame;

the vibrator including four reeds each having a free end and a foot, each of the reeds being a normally flat strip with one of its flat surfaces forming a plane, said feet being connected to said base, said vibrator including two connection pieces, each of said connection pieces connecting the free ends of two reeds so that they vibrate substantially along straight lines, characterized in that each of the free ends of at least the two reeds have extension pieces bent at an angle to the said plane, which extension pieces are joined to the said connection pieces.

2. An instrument as in claim 1 and further characterized in that the feet of two reeds are integrally connected by a joining portion which is integral with an extension foot member, the normally flat faces of the said two reeds are in a common plane, the said foot member being bent at an angle to the said common plane of said reeds, and said extension foot member being attached to said base.

3. An instrument according to claim 1, characterized in that the extensions are bent at about a 90° angle to the said plane.

4. A horological instrument having a frame and including a frequency standard, the frequency standard including a mechanical vibrator having a base mounted on the frame;

the vibrator including four reeds each having flat portions a free end and a foot, said feet being connected to said base, and including two connection pieces, each of said connection pieces connecting the free ends of two reeds so that they vibrate substantially along straight lines, in which each of the free ends of at least the two reeds have extension pieces bent at an angle to the flat portions of the reeds, which extension pieces are joined to the said connection pieces;

the feet of two reeds are integrally connected by a joining portion which is integral with an extension foot member, the said foot member being bent at an angle to the flat portions of said reeds, and said extension foot member being attached to said base.

5. An instrument according to claim 1, characterized by the fact that a reed has on its outer edge a recess, the said recess at one of its ends meeting an edge of the bending line of the extension member.

References Cited

UNITED STATES PATENTS

| | | | |
|---|---|---|---|
| 2,994,241 | 8/1961 | Gibbs | 84—457 |
| 3,167,905 | 2/1965 | Hetzel | 58—23 |
| 3,201,932 | 8/1965 | Sparing et al. | 58—23 |
| 3,277,394 | 10/1966 | Holt et al. | 58—23 |

FOREIGN PATENTS

| | | |
|---|---|---|
| 1,053,667 | 1/1947 | Great Britain. |

RICHARD B. WILKINSON, Primary Examiner

EDITH C. SIMMONS, Assistant Examiner

U.S. Cl. X.R.

331—156